3,583,999
PROCESS FOR PREPARING 2-PYRIDINETHIOL
N-OXIDES AND DERIVATIVES THEREOF
Ralph A. Damico, Colerain Township, Hamilton County,
Ohio, assignor to The Procter & Gamble Company,
Cincinnati, Ohio
No Drawing. Filed Nov. 1, 1968, Ser. No. 772,845
Int. Cl. C07d 31/50
U.S. Cl. 260—294.8G            7 Claims

ABSTRACT OF THE DISCLOSURE

Process for preparing 2-pyridinethiol N-oxides, amine salts thereof and 2,2'-dithiopyridine N,N'-dioxides which comprises heating a picolinic N-oxide acid or amine salt thereof at from 80° C. to about 150° C. in the presence of a sulfur-containing compound susceptible of transfer of a sulfur atom or in the presence of a sulfur monohalide. The resulting compounds are useful antibacterial, antifungal and/or antidandruff compounds.

BACKGROUND OF THE INVENTION

This invention relates in part to a method of preparing pyridine N-oxide derivatives. More particularly, it relates to a method of preparing 2-pyridinethiol N-oxides, salts thereof and 2,2'-dithiopyridine N,N'-dioxides.

Pyridinethiol N-oxides and salts thereof are known compounds having been described in U.S. Pat. 2,686,786 (Aug. 17, 1954), 2,809,971 (Oct. 15, 1957), 2,786,847 (Mar. 26, 1957), 3,236,733 (Feb. 22, 1966) and in J. Am. Chem. Soc. 72, 4362 (1950) and have been described as having antibacterial and antifungal properties. Such materials are especially noted for their remarkable antidandruff efficacy.

The 2-pyridinethiol N-oxides with which the present invention is concerned are believed to exist in tautomeric equilibrium with 1-hydroxy-2-pyridinethiones alternatively termed 1-hydroxy-2 (1H)-pyridinethiones. For example, 2-pyridinethiol N-oxide and its tautomeric form are represented as follows:

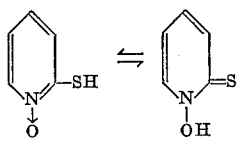

The term 2-pyridinethiol N-oxides as hereinafter employed is intended to encompass the tautomeric 1-hydroxy-2-pyridinethiones as well. Salts of these compounds may be represented by substitution of a cation for the hydrogen of one of the tautomeric forms. Depending upon the valence of the cation involved, there may be more than one pyridinethiol N-oxide group present in the compound. Disulfides of such compounds may be represented by the attachment of two 2-pyridinethiol N-oxide groups by the elimination of two hydrogens from the sulfur atoms to give a sulfur-to-sulfur or disulfide linkage.

The prior art preparation of salts of 2-pyridinethiol N-oxides has generally included (1) conversion of a 2-halopyridine to a 2-halopyridine N-oxide by reaction with a per-acid such as perbenzoic or peracetic acid; (2) reaction of the N-oxide formed with an alkali metal hydrosulfide, alkali metal sulfide or thiourea to effect substitution of a mercapto group for the halo-substituent and (3) reaction of the 2-pyridinethiol N-oxide formed with an aqueous solution of a basic compound such as sodium carbonate or a heavy metal compound such as zinc nitrate to effect the formation of a 2-pyridinethiol N-oxide salt.

The prior art process as generally outlined is subject to certain disadvantages. One disadvantage of the prior art process is that it requires the isolation and purification of several intermediates. For example, the 2-halopyridine employed in the prior art process must be separated from the small amounts of 2,6-dihalopyridine which inevitably form during the halogenation of pyridine despite the controlled conditions of halogenation employed. The purification of 2-halopyridine which tending to add to the cost of the initial starting material is necessary to avoid formation of undesirable disubstituted products which result from substitution of the halo-groups with mercapto groups upon subsequent reaction with alkali metal hydrosulfide.

Another undesirable aspect of the prior art process is the fact that the 2-halopyridine N-oxide produced by reaction of a per-acid with 2-halopyridine may not be reacted subsequently with an alkali metal sulfide or hydrosulfide to form the desired pyridinethiol N-oxide prior to separation from the unreacted per-acid. This separation is normally achieved by several extractions with hydrochloric acid solution followed by evaporation to dryness. Alternatively, the 2-halopyridine N-oxide may be prepared by reaction of the 2-halopyridine in acetic acid with a peracetic acid solution, and isolated by removal of acetic acid under reduced pressure, pouring of the residue over cracked ice, treatment with concentrated sodium hydroxide, extraction with chloroform, drying over magnesium sulfate, addition of ether, concentration and separation by filtration of the formed crystals. These techniques are described in U.S. Pat. 2,686,786.

A further disadvantage of the prior art method of preparing 2-pyridinethiol N-oxides is that certain of the per-acids, particularly peracetic acid, explode violently on heating which fact requires that processing conditions and precautionary measures be employed and carefully controlled so as to enable the process to be conducted safely and efficiently.

It is an object of the present invention to provide an improved method for preparing 2-pyridinethiol N-oxides and salts thereof.

It is another object of the present invention to provide an improved method for preparing 2,2'-dithiopyridine N,N'-dioxides.

Other objects of the present invention will be obvious from consideration of the invention described more fully hereinafter.

SUMMARY OF THE INVENTION

These and other objects of the present invention are achieved in accordance with the present invention which provides a process of preparing 2-pyridinethiol N-oxides and amine salts thereof which comprises heating a picolinic N-oxide compound selected from the group consisting of picolinic acid N-oxides and amine salts thereof at a temperature of about 80° C. to about 150° C. in the presence of a sulfur-containing transfer agent susceptible of nucleophilic attack and transfer of a sulfur atom.

Also provided by the present invention is a novel process of preparing dithiopyridine N,N'-dioxides by a process which comprises heating a 2-pyridinethiol N-oxide or amine salt thereof at a temperature of about 80° C. to about 150° C. in the presence of a sulfur monohalide of the formula $S_2X_2$ where X is halogen.

DETAILED DESCRIPTION OF THE INVENTION

The α-picolinic acid N-oxides employed in the present invention are characterized by the presence of a pyridine N-oxide nucleus and a carboxy group in the alpha position.

It has been found that subjecting these acids to temperatures of about 80° C. to about 150° C. in the presence of a sulfur-transfer agent hereinafter described effects decarboxylation with evolution of carbon dioxide and results, surprisingly, in the formation of 2-pyridinethiol N-oxides. For example, α-picolinic acid N-oxide

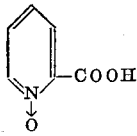

is readily decarboxylated with formation of 2-pyridinethiol N-oxide.

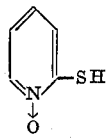

While the precise mechanism for the decarboxylation of picolinic acid N-oxides and formation of 2-pyridinethiol N-oxides is not completely understood, it is believed that an unstable intermediate carbanion of the following formula is involved.

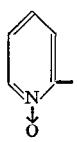

The carbanion is believed to be converted to the 2-pyridinethiol N-oxide compound by a mechanism involving nucleophilic attack on a sulfur atom.

The α-picolinic acid N-oxides of the present invention can be either substituted or unsubstituted compounds. As employed herein, the terms "an α-picolinic acid N-oxide" and "α-picolinic acid N-oxides" refer to substituted and unsubstituted picolinic acid N-oxides. Substituted compounds are those having one or more hydrogen atoms on the pyridine N-oxide nucleus replaced by a substituent group. Suitable substituent groups which can be present at any one or more of the 3-, 4-, 5-, and 6-positions are those which are substantially non-interfering, i.e., those which will not either sterically or by induction hinder decarboxylation of the α-picolinic acid N-oxide, react with pyridine N-oxide carbanion as formed or undergo reaction with the organic solvent or diluent medium of the decarboxylation reaction. Suitable substituent groups include, for example, alkyl groups, straight or branched, containing 1 to about 12 carbon atoms, (e.g., methyl, ethyl, n-propyl, isopropyl, n-butyl, isobutyl, n-pentyl, ethyl, n-propyl, isproyl, n-butyl, isobutyl, n-pentyl, hexyl, diisobutyl, n-nonyl, tripropylene, n-decyl, undecyl, n-dodecyl); alkenyl of 2 to about 12 carbon atoms (e.g., vinyl, allyl, methallyl, octenyl, 11-dodecenyl); cycloalkyl (e.g., phenyl, 4-biphenyl, 2-naphthly); aralkyl of about 7 to about 18 carbon atoms (e.g., benzyl, naphthylmethyl, 2-phenylethyl); alkaryl of about 7 to about 18 carbon atoms (e.g., o-, m- or p-hexylphenyl, o-, m- or p-dodecylphenyl); alkoxy of 1 to about 12 carbon atoms (e.g., methoxy, ethoxy, n-octoxy, n-dodecoxy); aryloxy of 6 to about 12 carbon atoms (e.g., phenoxy, 4-biphenyloxy, 2-naphthoxy). The presence of certain non-reactive groups in or on the exemplary groups hereinbefore described is permissible.

The preferred picolinic acid N-oxide of the present invention is α-picolinic acid N-oxide of the present invention is α-picolinic acid N-oxide. This acid is preferred from the standpoint of ready availability and facility of reaction.

It will be appreciated that the above described α-picolinic acid N-oxides are described by way of example only and that any picolinic acid N-oxide can be employed so long as the substituent groups are of a nature and are so positioned as to be substantially non-interfering as hereinbefore described.

The α-picolinate N-oxide amine salts useful herein are amine salts of any of the α-picolinate N-oxides described hereinbefore. Suitable amine salts are the addition salts of an α-picolinic acid N-oxide and a primary, secondary or tertiary amine having the formula

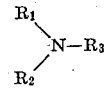

where $R_1$, $R_2$ and $R_3$ are the same or different and can be hydrogen, alkyl, cycloalkyl, arlkyl, aryl, alkaryl or amino alkyl. The amines contain from 1 to about 12 carbon atoms.

Salts of α-picolinic acid N-oxides and aminoalkyl-substituted amines, i.e. those amines wherein $R_1$, $R_2$ or $R_3$ in the above formula is aminoalkyl, are contemplated herein and include salts of alkylene polyamines in which the alkylene group contains from 2 to about 8 carbon atoms. These polyamines can contain from 1 to about 6 alkylene groups and up to about 7 amino groups.

Also contemplated herein are salts of α-picolinic acid N-oxides and salt-forming heterocyclic amines. These salt-forming amines include five-membered heterocyclic amines such as pyrrole and six-membered heterocyclic amines such as pyridine and the like.

The amines of the α-picolinic acid N-oxide salts can be substituted amines, suitable substituents being the hereinbefore described non-interfering substituents which can be present on the α-picolinic acid N-oxide compounds.

Examples of suitable amines include the following:

(1) Monoalkylamines such as methylamine, ethylamine, propylamine, isopropylamine, n-butylamine, sec-butylamine, isobutylamine, pentylamines, hexylamines, cyclohexylamine, heptylamines, octylamines, dodecylamines, and benzylamine.

(2) Dialkylamines such as dimethylamine, diethylamine, di-n-propylamine, diisopropylamine, di-n-butylamine, di-sec-butyl-amine, diisobutylamine, di-tert-butylamine, di-pentyl-amines, dihexylamines, N-methylenethylamine, N-methyl-propylamine, N-methyl-n-decylamine, N-ethylhexylamine, N-ethyl-n-octyly-amine and N-propyl-n-decylamine.

(3) Trialkylamines such as trimethylamine, triethylamine, tri-n-propylamine, triisopropylamine, tri-n-butylamine, tri-sec-butylamine, triisobutylamine, tri-tert-butylamine, N-methyl-di-n-butylamine, N-ethyl-di-sec-butylamine and N-isopropyl-di-n-butylamine.

(4) Five and six-membered heterocyclic amines such as pyrrole, pyridine, collidine, lutidine, quinoline and morpholine.

(5) Arylamines such as aniline, toluidine, anisidine, xylidines, 4-ethylaniline and naphthylamine.

(6) Alkylarylamines having an alkyl attached to the N-atom or to the aryl group such as N-ethylaniline, N-methyl-o-toluidine, N-methyl-p-toluidine, N-methylaniline, N,N-dimethyl-phenylenediamine, 4-ethylaniline, 4-propylaniline, 4-butylaniline, and 4-decylaniline.

(7) Aminoalkyl-substituted amines such as ethylenediamine, diethylenetriamine, triethylenetetramine, 1,3-propylenediamine and di-1,3-propylenetriamine.

The amine salts of picolinic acid N-oxides when heated in the presence of sulfur transfer agents hereinafter described are converted to amine salts of 2-pyridinethiol N-oxides. This reaction is illustrated in the case of decarboxylation of the tributylamine salt of 2-picolinic acid N-oxide in the presence of sulfur by the following scheme:

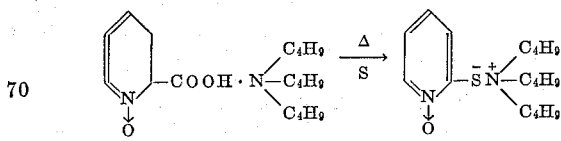

The 2-pyridinethiol N-oxides and amine salts are prepared by heating an α-picolinic acid N-oxide or amine salt at a temperature of from about 80° C. to 150° C., preferably at about 100° C. to 120° C. in the presence of a sulfur transfer agent. The reaction or decomposition proceeds with evolution of carbon dioxide and is conducted for a period of time of about 1 to about 24 hours. While the reaction can be conducted for a period of time which is either less than or greater than that required to effect the substantial completion of decarboxylation, it is preferred that the reaction be conducted until the evolution of carbon dioxide is substantially complete.

The decarboxylation reaction of the present invention can be conducted in the absence of a solvent. For best yields, however, it is preferred that an organic diluent or solvent be employed. These diluents or solvents are organic materials which are substantially inert or non-reactive. They should not contain any reactive constituent either as a part of the structure of the solvent or as a part of impurities present therein.

Since pyridine N-oxide carbanions are undesirably converted to pyridine N-oxides by reaction with a proton, suitable solvents herein are those which are aprotic and which under the decarboxylation conditions hereinbefore defined will not donate a portion for reaction with the intermediate carbanion. Similarly, suitable solvents or diluents herein are organic materials which are free of impurities which tend to react undesirably with carbanions. For example, water readily destroys pyridine N-oxide carbanions by donation of a proton. Accordingly, the solvents or diluents employed herein should be substantially anhydrous.

Suitable solvents or diluents are to be found in such classes of compounds as the aliphatic or aromatic hydrocarbons, aliphatic, aromatic or mixed-aliphatic-aromatic ethers, cyclic ethers or amines. Among the ether compounds which are suitable as solvents are dibutyl ether, anisole, diphenyl ether, dioxane, 1,2-dimethoxyethane and diethylene glycol dimethyl ether. Amine compounds which can serve as solvents for the decarboxylation reaction as well as salt-forming compounds include tripropyl amine, pyridine and morpholine. Examples of suitable non-reactive hydrocarbon solvents include "Stoddard" solvent, benzene, toluene and mixed xylenes. Still other compounds which are suitable are N,N-dialkyl amides such as dimethyl formamide and dimethyl acetamide; dialkyl sulfoxides such as dimethyl sulfoxide; nitriles such as acetonitrile, propionitrile, butyronitrile and valeronitrile; and hexaalkylphosphorotriamides such as hexamethylphosphorotriamide.

Preferred solvents or diluents herein are those having boiling points at atmospheric pressure of at least about 80° C. These materials are preferred because they make possible the rapid decarboxylation at atmospheric pressure of picolinate N-oxide salts at temperatures of 80° C. or higher. When solvents or diluents which boil at temperatures below about 80° C. are employed, the decarboxylation reaction which requires heating at a temperature of about 80° C. to about 150° C. can be conducted in sealed reactors, as for example, in an autoclave.

Especially preferred as solvents for decarboxylation are those organic, aprotic, materials which readily dissolve the sulfur transfer agents hereinafter described. This facilitates conversion of the carbanion intermediate to the desired 2-pyridinethiol N-oxide because the carbanion reacts with the sulfur transfer agent immediately upon its formation. These especially preferred solvents include, for example, dibutyl ether, diethylene glycol dimethyl ether, pyridine and dimethyl formamide.

The amount of solvent or diluent employed herein is not a critical aspect of the present invention. A ratio of solvent or diluent to α-picolinic acid N-oxide or amine salt on a weight basis of about 1:1 to about 50:1 is useful herein. A ratio of about 2:1 to about 10:1 is preferred for reasons of efficiency and economy of operation.

The decarboxylation of picolinic acid N-oxides and amine salts thereof is conducted in the presence of a sulfur-containing transfer agent which is susceptible of nucleophilic attack and transfer of a sulfur atom. The carbanion intermediate which is formed by decarboxylation tends to react readily with a proton available from the carboxy group of a picolinic acid N-oxide or salt thereof to form an undesirable pyridine N-oxide. In order to minimize the conversion of carbanion intermediate to pyridine N-oxide, the decarboxylation of the present invention is conducted in the presence of the sulfur-containing transfer agent. The presence of the transfer agent during the decarboxylation reaction minimizes the formation of pyridine N-oxide by reacting with the carbanion intermediate in competition with a proton, thereby forming a 2-pyridinethiol N-oxide.

The sulfur-containing transfer agents which can be employed herein are those sulfur-containing compounds susceptible of nucleophilic attack and removal of a sulfur atom. Examples of sulfur-containing transfer agents which are utilizable in accordance with the present invention include the following materials:

(1) Elemental sulfur (e.g., rhombic sulfur, monoclinic sulfur);

(2) Alkali metal sulfides of the formula $M_2S_x$ where M is an alkali metal (e.g., sodium, potassium, lithium) and $x$ is an integer from 2 to about 50;

(3) Sulfurammonium, $S_4N_4$;

(4) Thiophosphoryl trihalides of the formula $P(S)X_3$ where X is halogen (e.g., chlorine bromine);

(5) Alkyl- or aryldihalophosphine sulfides of the formula $R-P(S)X_2$; where R is alkyl of from 1 to about 12 carbon atoms (e.g., methyl, ethyl, ethylhexyl, dodecyl); aryl of from 6 to about 14 carbon atoms; and X is halogen;

(6) Dialkylhalophosphine sulfides of the formula $R_2P(S)X$ where each R is alkyl of from 1 to about 12 carbon atoms and X is halogen;

(7) Phosphinyl sulfenyl halides of the formula $R(RO)P(O)SX$ where each R is alkyl of 1 to about 12 carbon atoms and X is halogen;

(8) Tetraalkylphosphonate disulfides of the formula $[(RO)_2P(S)]_2$ where each R is alkyl of 1 to about 12 carbon atoms;

(9) Ethylene diphosphine disulfides of the formula $[R_2P(S)CH_2-]_2$ where each R is alkyl of 1 to about 12 carbon atoms;

(10) Isothiocyanates of the formula $RNC=S$ where R is an alkyl of from 1 to about 12 carbon atoms; aryl of 6 to about 14 carbon atoms (e.g., phenyl, naphthyl, biphenyl); and alkenyl of from 2 to about 12 carbon atoms (e.g., vinyl, allyl, 4-octenyl, 11-dodecenyl);

(11) Diisothiocyanates of the formula $SCN-R-NCS$ where R is an alkylene radical of from 1 to about 12 carbon atoms (e.g., methylene, ethylene, ethylidene, propylene);

(12) Thioepoxides of the formula

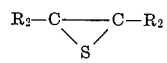

wherein each R is hydrogen or an alkyl or alkoxy of from 1 to about 12 carbon atoms; or aryl of from 6 to about 14 carbon atoms;

(13) Ethylenethiocarbonates of the formula

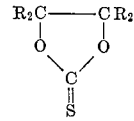

wherein each R is hydrogen; alkyl of from 1 to about 12 carbon atoms; or aryl of 6 to about 14 carbon atoms;

(14) Thioketones of the formula $R_2C=S$ where each R is a tertiary alkyl of from 4 to about 12 carbon atoms or aryl of from 6 to about 12 carbon atoms; and

(15) Organopolysulfides of the formula $R-(S)_x-R$ where each R is alkyl of from 1 to about 12 carbon atoms; or alkenyl of from 2 to about 12 carbon atoms; and $x$ is an integer from 2 to 4.

Preferred sulfur-containing transfer agents are those which transfer a sulfur atom with facility and which are readily available. Preferred transfer agents are the various forms of elemental sulfur, the thioepoxides such as 2,3-epithiopropylmethylether, 2,3-epithiobutene and stilbenepisulfide, ethylene episulfide, and the alkali metal sulfides such as lithium disulfide, lithium trisulfide and sodium polysulfide.

Suitable sulfur-containing transfer agents and their formulas are as follows:

| | |
|---|---|
| sodium disulfide | $Na_2S_2$ |
| thiophosphoryl trichloride | $P(S)Cl_3$ |
| butyldichlorothiophosphonate | $C_4H_9P(S)Cl_2$ |
| diethylchlorothiophosphinate | $(C_2H_5)_2P(S)Cl$ |
| methyl methoxyphosphinyl sulfenyl chloride | $(CH_3)(CH_3O)P(O)SCl$ |
| tetraethylphosphonate disulfide | $[(C_2H_5O)_2P(S)]_2$ |
| 1,2-ethylenetetramethyldiphosphine disulfide | $[(CH_3)_2P(S)CH_2-]_2$ |
| propylisothiocyanate | $C_3H_7NCS$ |
| propyldiisothiocyanate | $SCN-C_3H_7-NCS$ |
| 1,2-diphenylethylenethioepoxide | $C_6H_5-\underset{\underset{S}{\diagdown\diagup}}{C}\overset{H}{\underset{}{-}}\overset{H}{\underset{}{C}}-C_6H_5$ |
| dimethyltrisulfide | $CH_3-S-S-S-CH_3$ |

It will be appreciated, of course, that the afore-described sulfur-containing transfer agents are listed by way of example only and are not intended as limiting the scope of the present invention. Since any sulfur-containing material having a sulfur atom capable of attack and removal by a negatively charged carbanion can be employed, the precise sulfur containing transfer agent employed is not considered a critical aspect of the present invention.

The amount of sulfur-transfer agent employed herein is an amount corresponding to a ratio of sulfur transfer agent to picolinic N-oxide acid or amine salt of about 1:5 to 50:1 on a molar basis. It will be appreciated that the amount of sulfur transfer agent employed will vary with the particular transfer agent. For example, in the case of elemental sulfur, a ratio of about 1:2 to about 10:1, and preferably 1:1 to 5:1 is employed.

Normally, the reaction of a picolinic N-oxide or amine salt and a sulfur-containing transfer agent is effected by the addition of the sulfur-containing compound to a solution of the picolinic acid N-oxide or salt. Any order of mixing can be employed, so long as the decarboxylation or decomposition reaction is conducted in the presence of the transfer agent and the requisite proportions of picolinic acid N-oxide or salt and transfer agent are allowed to interact in the specified temperature range.

In another embodiment of the present invention, picolinic acid N-oxides and amine salts thereof are converted readily to 2,2'-dithiopyridine N,N'-dioxides by decarboxylation in the presence of a sulfur monohalide.

The 2,2'-dithiopyridine N,N'-dioxides are prepared in accordance with this invention by reacting an α-picolinic acid N-oxide or amine salt with a sulfur monohalide at a temperature of from about 80° to about 150° C. The conditions of reaction are normally the same conditions under which the picolinic N-oxide compounds are allowed to react with the sulfur-containing transfer agents hereinbefore described. The proportions of picolinic acid N-oxide or salt employed are such that the ratio of sulfur monohalide to picolinic acid or amine salt is about 1:5 to about 50:1 on a molar basis and preferably 1:2 to about 10:1. Since the reaction does not appear to involve removal or transfer of a sulfur atom from a sulfur monohalide to the pyridine N-oxide carbanion salt, sulfur monohalides are not transfer agents in the sense hereinbefore employed. Rather, the two sulfur atoms present in sulfur monohalides remain substantially intact, the reaction proceeding by displacement of halogen atoms. The decarboxylation reaction of α-picolinic acid N-oxide, for example, in the presence of sulfur monochloride can be represented as follows:

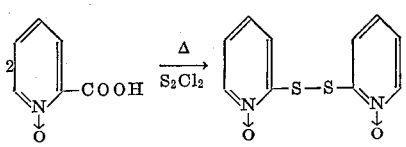

The 2-pyridinethiol N-oxides, amine salts thereof and 2,2'-dithiopyridine N,N'-dioxides prepared as hereinbefore described can be separated from pyridine N-oxide co-product by conventional methods. For example, separation of pyridine N-oxide from the products of the present invention is readily achieved by neutralization with aqueous sodium hydroxide and extraction with chloroform or other solvents. Alternatively, the 2-pyridinethiol or salt thereof can be precipitated out of solution as the zinc salt.

The products of the present process are useful per se as antibacterial and anti-fungal compounds. U.S. Pat. 2,686,786 (Aug. 17, 1954) describes 2-pyridinethiol N-oxides, and their alkali and alkaline earth metal salts as antibacterial and anti-fungal compounds. U.S. Pat. 2,809,971 (Oct. 15, 1957) describes heavy-metal salts of 2-pyridinethiol N-oxides as fungicides and bactericides. Amine and quaternary ammonium antibacterial and antifungal salts of 2-pyridinethiol N-oxides are described in U.S. Pat. 2,742,393 (Apr. 17, 1956).

The alkali metal and alkaline earth metal salts of 2-pyridinethiol N-oxides are prepared readily by neutralization of the 2-pyridinethiol N-oxide or amine salt with an inorganic alkaline reagent. Sodium hydroxide and barium carbonate, mentioned by way of example, are useful for this purpose. It will be appreciated, however, that any of the common alkaline materials normally employed to effect neutralization can be likewise employed herein.

The heavy metal salts of 2-pyridinethiol N-oxides can be prepared by reacting a 2-pyridinethiol N-oxide or soluble salt thereof such as alkali metal or ammonium salt with a soluble compound of the desired heavy metal in a solvent for the reactants and recovering the reaction product. Suitable heavy metal salts useful in effecting formation of pyridinethiol N-oxide salts include nitrates, halides, sulfates and acetates of copper, iron, manganese, tin, mercury, cobalt, chromium, zirconium, lead, gold, cadmium, nickel, silver, zinc, titanium, arsenic, antimony and bismuth. The term heavy metal as herein employed is intended to include heavy non-metals of metallic character, such as arsenic.

The compounds prepared herein can be employed in the preparation of other useful compounds. Esters useful as bactericides, fungicides and preservatives in leather, paper, and fabrics prepared by reaction of the sodium salt of 2-pyridinethiol N-oxides with fatty acid anhydrides are described in U.S. Pat. 3,310,568 (Mar. 21, 1967). Triphenyltin complexes of 2-pyridinethiol N-oxide are described in U.S. Pat. 3,321,480 (May 22, 1967). The 2,2-dithiopyridine-N,N-dioxides prepared as hereinbefore described as well as stannous fluoride complexes thereof are also useful antifungal and antibacterial agents as described in U.S. Pats 2,742,476 (Apr. 17, 1956) and 3,346,578 (Oct. 10, 1967).

The alkali metal salts of 2-pyridinethiol N-oxides and the 2,2'-dithiopyridine N,N-dioxides which possess antibacterial and/or antifungal properties can be employed in detergent formulations, particularly as antidandruff agents in shampoo compositions. Similarly, 2-pyridinethiol N-oxides per se as well as heavy metal salts thereof, particularly zinc, cadmium, tin and zirconium salts of pyridinethiol N-oxides and organic amine and quaternary salts are especially effective antidandruff compounds for use in shampoo formulations. The efficacy of these materials as antidandruff compounds is known and is described in detail in U.S. Pat. 3,236,733 (Feb. 22, 1966) the disclosure of which is thereby incorporated by reference.

The following examples illustrate in detail the preparation of compositions characterized by antibacterial, antifungal and/or antidandruff properties. It will be understood that the invention is not confined to the specific limitations set forth in the following examples but rather, to the scope of the appended claims.

EXAMPLE I

Preparation of 2-pyridinethiol N-oxide (A) A 250 ml. three-necked flask equipped with magnetic stirring means, a reflux column and a mineral oil bubbler connected to two (2) barium hydroxide traps in series was employed in the present example. To the flask were added 5.0 g. (0.036 mole) of α-picolinic acid N-oxide; 2.3 g. (0.072 g.-atom) of elemental sulfur and 125 ml. of Diglyme solvent $(CH_3OCH_2CH_2)_2O$. The reaction mixture was heated with stirring at a temperature of 110° C. until the evolution of carbon dioxide, evidenced by formation of barium carbonate in the barium hydroxide traps, had ceased (2.75 hours). The reaction mixture was cooled to approximately 25° C. and filtered through filter paper. The filtrate was then evaporated to dryness. Thin layer chromatographic analysis of the resulting product confirmed the presence of 2-pyridinethiol N-oxide in approximately 44% yield (based on the amount of α-picolinic acid N-oxide reactant).

Similar results are obtained when the following sulfur transfer agents are employed in lieu of elemental sulfur in that 2-pyridinethiol N-oxides are obtained: lithium disulfides; sulfurammonium; sodium polysulfide (having a distribution of from 2 to about 40 sulfur atoms); thiophosphoryl tribromide; n - octyldichlorothiophosphonate, phenyldichlorothiophosphonate; dioctylchlorothiophosphinate; ethyl ethoxyphosphinyl sulfenyl chloride; tetrabutylphosphonate disulfide; 1,2-ethylenetetrabutyldiphosphine disulfide; phenylisothiocyanate; n - octylisothiocyanate, allylisothiocyanate; vinylisothiocyanate; butyldiisothiocyanate; ethylenethioepoxide; 1, 2 - di-n-hexylethylenethioepoxide; 1,2 - dimethoxyethylenethioepoxide; 1,2-diphenylethylenethiocarbonate; ethylenethiocarbonate; 1, 2-dibutylethylenethiocarbonate; ditertbutylthioketone; diphenylthioketone; di - n - octyldisulfide; and diallyltetrasulfide.

When in the above example the following groups are substituted for one or more of the 3-, 4-, 5-, or 6-hydrogen atoms of a-picolinic acid N-oxide, substantially the same results are achieved in that the correspondingly substituted 2-pyridinethiol N-oxides are obtained: methyl; ethyl; n-propyl; isopropyl; n-butyl; isobutyl; n-pentyl; isopentyl; n-hexyl; n-heptyl; n-octyl; isooctyl; 2-ethylhexyl; diisobutyl; n-nonyl; tripropylene; n-decyl; undecyl; n-dodecyl; vinyl; propentyl; octenyl; 10-undecenyl; 11-dodecenyl; cyclopentyl; cyclohexyl; phenyl; biphenyl; naphthyl; benzyl; 2-phenyl-dodecyl; 1-methyl-2-phenylethyl; naphthylmethyl; p-hexylphenyl; M-dodecylphenyl; o-butylphenyl; methoxy; ethoxy; n-propoxy; isopropoxy; butoxy; n-dodecoxy; phenoxy; and biphenyloxy.

When in the above example the following solvents are substituted either wholly or in part for the Diglyme similar results are obtained in that the same reactions occur: benzene, 1,2-methoxy ethane (Monoglyme), diphenyl ether, tetrahydrofuran, dioxane, N,N-dimethyl formamide, xylene, "Stoddard" solvent, toluene, dibutyl ether, dimethylacetamide dimethylformadide, acetonitrile, propionitrile, butyronitrile, valeronitrile and hexamethylphosphorotriamide, and mixtures thereof.

EXAMPLE II

Preparation of the collidine salt of 2-pyridinethiol N-oxide

The apparatus of Example I was employed herein. To the flask were added 5.0 g. (0.036 mole) of α-picolinic acid N-oxide; 4.36 g. (0.036 mole) of collidine (2,4,6-trimethylpyridine); and 2.53 g. (0.079 g.-atom) elemental sulfur. The reaction mixture was heated with stirring at a temperature of 125° C. until the evolution of carbon dioxide had ceased (3 hours). Evaporation to dryness yielded the desired product, the collidine salt of 2-pyridinethiol N-oxide. The potassium salt of 2-pyridinethiol N-oxide was obtained by dissolving the dried collidine salt in water, rendering the solution basic with 20% aqueous sodium hydroxide, salting out with 50% aqueous potassium carbonate and extraction with isopropanol. An additional isopropanol extraction, filtration through activated charcoal and evaporation to dryness yielded 2.2 g. of the desired potassium salt of 2-pyridinethiol N-oxide (30% yield).

EXAMPLE III

Preparation of the pyridine salt of 2-pyridinethiol N-oxide

The apparatus of Example I was employed herein. To the reaction flask were added 5.0 g. (0.036 mole) of α-picolinic acid N-oxide; 100 ml. of pyridine; and 1.73 g. (0.054 mole) of elemental sulfur. The reaction mixture was heated at a temperature of 120° C. until the evolution of carbon dioxide gas, evidenced by formation of barium carbonate in the barium hydroxide traps, had ceased (2.0 hours). Analysis of the barium carbonate formed indicated that 80% of theoretical carbon dioxide gas had been evolved. The reaction product containing the pyridine salt of 2-pyridinethiol N-oxide was cooled to 25° C. and evaporated under reduced pressure (20 mm.). The product was added to 100 ml. of water and filtered with separation of 1.3 g. of unreacted sulfur. Thin layer chromatographic analysis of the filtrate confirmed the formation of the desired product and pyridine N-oxide. Treatment of the filtrate with 5.3 g. (0.018 mole) of zinc nitrate hexahydrate $(Zn(NO_3)_2 \cdot 6H_2O)$ resulted in the formation of a light brown precipitate which was filtered, washed with 25 ml. water followed by 50 ml. acetone. The zinc 2-pyridinethiol N-oxide salt (1.8 g.) was obtained in a 30% yield.

Similar results are obtained when salts of picolinic acid N-oxide and the following amines are employed in lieu of the pyridine salt of α-picolinic acid N-oxide in that the corresponding amine salts of 2-pyridinethiol N-oxide are obtained: methylamine, ethylamine, propylamine, isopropylamine, n-butylamine, sec-butylamine, isobutylamine, pentylamines, hexylamines, cyclohexylamines, heptylamines, octylamines, dodecylamines, benzylamine, 2-ethoxyethylamine, 4-carbomethoxyhexylamine, dimethylamine, diethylamine, di-n-propylamine, diisopropylamine, di-n-butylamine, di-sec-butylamine, diisobutylamine, di-tert-butylamine, dipentylamines, dihexylamines, N - methylethylamine, N-methyl-propylamine, N-methylethylamine, N - methylpropylamine, N - methyl-n-decylamine, N - ethylhexylamine, N - ethyl-n-octylamine, N-propyl-n-decylamine, trimethylamine, triethylamine, tri-n-propylamine, tri-isopropylamine, tri-n-butylamine, tri-sec-butylamine, triisobutylamine, di-tert-butylamine, N-methyl-di-n-butylamine, N-ethyl-di-sec - butylamine, N-isopropyl - di - n-butylamine, piperidine, pyrrole, lutidine, morpholine, quinoline, aniline, toluidine, anisidine, xylidines 4-ethylaniline, naphthalamine, N-ethylaniline, N-methyl-o-toluidine, N-methyl-p-toluidine, N - methylaniline, N,N-dimethylphenylenediamine, 4-ethylaniline, 4-propylaniline, 4 - butylaniline, 4-decylaniline, ethylenediamine, diethylenetriamine, triethylenetetramine, 1,3-propylenediamine and di-1,3-propylenetriamine.

EXAMPLE IV

Preparation of the tributylamine salt of 2-pyridinethiol N-oxide

Employing the apparatus of Example I, 9.1 g. of the tributylamine salt of α-picolinic N-oxide (0.028 mole) is decarboxylated in the presence of 3.1 g. (0.028 mole) of lithium trisulfide at 100° C. until the evolution of carbon dioxide ceases employing 100 ml. of tetrahydrofuran as the solvent. The desired product, the tributylamine salt of 2-pyridinethiol N-oxide is obtained upon evaporation to dryness.

Similar results are obtained when the following 3-, 4-, 5- and/or 6-substituted α-picolinic acid N-oxides are employed in lieu of α-picolinic acid N-oxide in that the correspondingly substituted salts of 2-pyridinethiol N-oxides are obtained: $C_{1-12}$ alkyl (e.g., methyl, ethyl, n-propyl, isopropyl, n-butyl, isopentyl, n-hexyl, n-heptyl, 2-ethylhexyl, n-nonyl, n-dodecyl) substituted α-picolinic acid N-oxides, $C_{2-12}$ alkenyl (e.g., vinyl, allyl, methallyl, 5-hexenyl, 4-decenyl, 11-dodecenyl) substituted α-picolinic acid N-oxides; $C_{6-12}$ aryl (e.g., phenyl), p-biphenylyl, naphthyl) substituted α-picolinic acid N-oxides; cycloalkyl (e.g., cyclohexyl) substituted α-picolinic acid N-oxides; $C_{7-18}$ aralkyl (e.g., benzyl, 2-phenylethyl) substituted α-picolinic acid N-oxides and $C_{7-18}$ alkaryl (e.g., p-tolyl, o-dodecylphenyl) substituted α-picolinic acid N-oxides.

EXAMPLE V

Preparation of 2,2'-dithiopyridine-N,N'-dioxide

Employing the apparatus of Example I, 17.5 g. (0.126 mole) of α-picolinic acid N-oxide, 100 ml. of Monoglyme (1,2-dimethoxyethane), and 8.5 g. (0.063 mole) of sulfur monochloride are added to the reaction flask with argon flushing and stirring. The reaction mixture is heated until the evolution of carbon dioxide ceases at a temperature of 120° C. The product is filtered and the filtrate evaporated to dryness and washed with water, to yield the desired product, 2,2'-dithiopyridine-N,N'-dioxide.

Substantially similar results are obtained when sulfur monobromide or sulfur monoiodide are employed in lieu of sulfur monochloride in that the desired 2,2'-dithiopyridine-N,N'-dioxide is formed.

When the following groups are substituted for one or more of the 3-, 4-, 5-, or 6-hydrogen atoms of 2-picolinic acid N-oxide, the same results are obtained in that the correspondingly substituted 2,2'-dithiopyridine-N,N'-dioxide compounds are prepared: methyl; ethyl; n-propyl; isopropyl; n-butyl; isobutyl; n-pentyl; isopentyl; n-hexyl; n-heptyl; n-octyl; isooctyl; 2-ethylhexyl; diisobutyl; n-nonyl; tripropylene, n-decyl; undecyl; n-dodecyl; vinyl; propenyl; octenyl; 10-undecenyl; 11-dodecenyl; cyclopentyl; cyclohexyl; phenyl; biphenyl; naphthyl; benzyl; 2-phenyldodecyl; 1-methyl - 2 - phenylethyl; naphthylmethyl; p-hexyl phenyl; m-dodecylphenyl; o-butylphenyl; methoxy; ethoxy; n-propoxy; isopropoxy; butoxy; n-dodecoxy; phenoxy; and biphenyloxy.

Similar results are obtained when salts of α-picolinic acid N-oxide and any of the following amines are employed in lieu of α-picolinic acid N-oxide in that the desired 2,2'-dithiopyridine-N,N'-dioxide is obtained: methylamine, ethylamine, propylamine, isopropylamine, n-butylamine, sec-butylamine, isobutylamine, pentylamines, hexylamines, cyclohexylamines, heptylamines, octylamines, dodecylamines, benzylamine, 2-ethoxyethylamine, 4-carbomethoxyhexylamine, dimethylamine, diethylamine, di-n-propylamine, diisopropylamine, di-n-butylamine, di-sec-butylamine, diisobutylamine, di-tert-butylamine, di-pentylamines, dihexylamines, N-methylethylamine, N-methyl-propylamine, N-methylethylamine, N-methylpropylamine, N-methyl-n-decylamine, N-ethylhexylamine, N-ethyl-n-octylamine, N-propyl - n - decylamine, trimethylamine, triethylamine, tri-n-propylamine, tri-isopropylamine, tri-n-butylamine, tri-sec-butylamine, triisobutylamine, di-tert-butylamine, N-methyl-di-n-butylamine, N-ethyl-di-sec-butylamine, N-isopropyl-di-n-butylamine, piperidine, pyrrole, lutidine, morpholine, quinoline, aniline, toluidine, anisidine, xylidines, 4-ethylaniline, naphthylamine, N-ethylaniline, N-methyl-o-toluidine, N-methyl-p-toluidine, N - methylaniline, N,N - dimethylphenylenediamine, 4-ethylaniline, 4-propylaniline, 4-butylaniline, 4-decylaniline, ethylenediamine, diethylenetriamine, triethylenetetramine, 1,3-propylenediamine and di-1,3-propylenetriamine.

EXAMPLE VI

Preparation of the zinc salt of 2-pyridinethiol N-oxide

The 2-pyridinethiol N-oxide prepared in Example I is dissolved in approximately 15 ml. of water and is added to a solution of 5.9 (0.02 mole) of zinc nitrate hexahydrate and allowed to react for approximately 10 minutes at approximately 25° C. The product upon separation by filtration is the zinc salt of 2-pyridinethiol-N-oxide.

The foregoing description of the invention has been presented describing certain operable and preferred embodiments. It is not intended that the invention should be limited since variation and modifications thereof will be obvious to those skilled in the art, all of which are within the spirit and scope of this invention.

What is claimed is:

1. The process of preparing a 2-pyridinethiol N-oxide or amine salt thereof which comprises heating a picolinic N-oxide compound selected from the group consisting of
   (1) α-picolinic acid N-oxides
   (2) amine salts of an α-picolinic acid N-oxide and an amine from 1 to about 12 carbon atoms having the formula

wherein each $R_1$, $R_2$ and $R_3$ is hydrogen, alkyl, aralkyl, cycloalkyl, aryl, alkaryl, or aminoalkyl; and
   (3) amine salts of an α-picolinic acid N-oxide and a 5- or 6-membered heterocyclic compound having one nitrogen hetero atom;
at a temperature of about 80° C. to about 150° C. in the presence of elemental sulfur.

2. The process of claim 1 wherein the molar ratio of sulfur to picolinic N-oxide compound is from about 1:5 to about 50:1.

3. The process of claim 2 wherein the picolinic N-oxide compound is heated at a temperature of about 100° C. to 120° C.

4. The process of claim 3 wherein the picolinic N-oxide compound is α-picolinic acid N-oxide.

5. The process of claim 3 wherein the picolinic N-oxide compound is an amine salt of an α-picolinic acid N-oxide and an amine of the formula

wherein each $R_1$, $R_2$ and $R_3$ is hydrogen or alkyl; said amine having from 1 to about 12 carbon atoms.

6. The process of claim 3 wherein the picolinic N-oxide compound is heated in the presence of an organic aprotic solvent.

7. The process of claim 6 wherein the organic aprotic solvent has a boiling point at atmospheric pressure of at least about 80° C.

References Cited

Haaki et al., J. Am. Chem. Soc., vol. 86, pp. 5230–4 (1962).

Quast et al. Angew. Chem., International, edit., vol. 4, p. 691, (1965).

Abramovitch et al., J. Am. Chem. Soc., vol. 89, p. 537 (1967).

Niwa et al., Chem. Ber., 89, p. 3215 (1966).

ALAN L. ROTMAN, Primary Examiner

U.S. Cl. X.R.

260—247–I, 283–S, 286–R, 293.4–A, 294.8–T, 270–R, 999

PO-1050
(5/69)

UNITED STATES PATENT OFFICE
CERTIFICATE OF CORRECTION

Patent No. 3,583,999       Dated  June 8, 1971

Inventor(s) Ralph A. Damico

It is certified that error appears in the above-identified patent and that said Letters Patent are hereby corrected as shown below:

Column 1, line 49 -- 2-pyridinethiol N-oxide -- and -- 1-hydroxy-2-pyridinethione -- were omitted beneath the structural formulas.

Column 2, line 8, "which" should be -- while --.

Column 3, line 50, after "n-pentyl" -- isopentyl -- should be inserted.

Column 3, line 51, should be deleted.

Column 3, line 52, "hexyl" should be -- n-hexyl --.

Column 3, line 52, after "hexyl" the following should be inserted -- n-heptyl, n-octyl, isooctyl, 2-ethylhexyl, --.

Column 3, line 54, after "cycloalkyl" -- (e.g., cyclopentyl, cyclohexyl); aryl of about 6 to about 12 carbon atoms -- should be inserted.

Column 3, line 66, "of the present invention is α-picolinic acid N-oxide" should be deleted.

Column 4, line 10, "arlkyl" should be -- aralkyl --.

Column 4, line 67, " 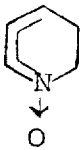 " should be -- 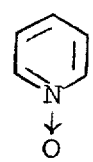 --.

Column 12, line 50,    " 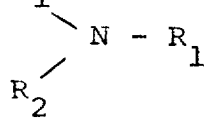 "    should be    -- 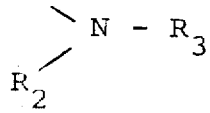 --.

Signed and sealed this 11th day of January 1972.

(SEAL)
Attest:

EDWARD M. FLETCHER, JR.        ROBERT GOTTSCHALK
Attesting Officer              Acting Commissioner of Patents